Figure 3:
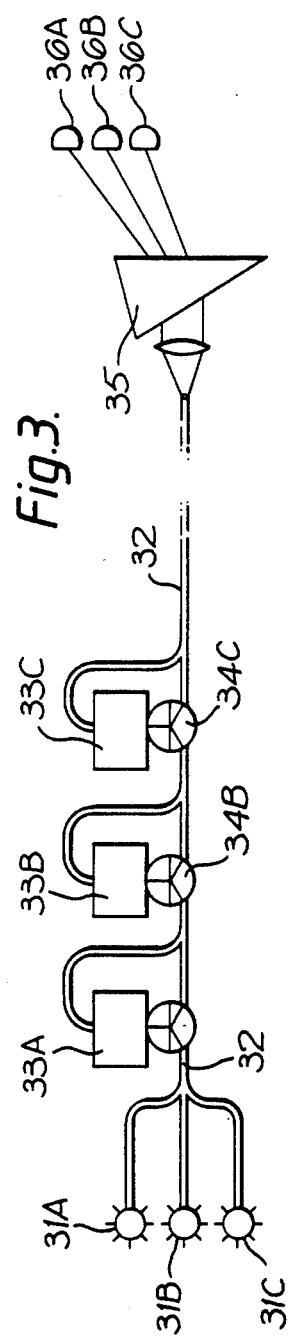

United States Patent [19]

Halsall et al.

[11] Patent Number: 4,517,456

[45] Date of Patent: May 14, 1985

[54] COLOR MULTIPLEXING PASSIVE SENSOR ARRAY

[75] Inventors: James R. Halsall, Runcorn; Robert T. Murray, Helsby, both of England

[73] Assignee: Imperial Chemical Industries PLC, Hertfordshire, England

[21] Appl. No.: 328,712

[22] Filed: Dec. 8, 1981

[30] Foreign Application Priority Data

Dec. 17, 1980 [GB] United Kingdom ................. 8040394

[51] Int. Cl.³ ............................................. G01J 3/34
[52] U.S. Cl. ................................... 250/226; 250/227; 455/610
[58] Field of Search ................... 250/226, 227, 231 R; 455/610, 612; 356/402, 425

[56] References Cited

U.S. PATENT DOCUMENTS

| | | | |
|---|---|---|---|
| 3,845,294 | 10/1974 | Indig et al. | 455/610 |
| 3,953,727 | 4/1976 | D'Auria et al. | 455/610 |
| 4,223,216 | 9/1980 | Quick et al. | 250/226 |
| 4,247,202 | 1/1981 | Failes | 250/226 |

FOREIGN PATENT DOCUMENTS 1540907  2/1979  United Kingdom .

Primary Examiner—David C. Nelms
Attorney, Agent, or Firm—Cushman, Darby & Cushman

[57] ABSTRACT

Apparatus for gathering data about a plurality of chemical or physical conditions, e.g. on industrial plants, utilizes a plurality of passive optical sensors. Light for the sensors is provided by a common broadband source, and distributed by an optical fiber from which light of a selected color is withdrawn for each sensor in turn, the color selected for each sensor being different from that selected for the other sensors. Each color is modified by its respective sensor as a function of changes in the conditions applied to the sensor, and all the modified colors are conveyed along a common data bus to be demultiplexed and the data displayed. The colors may be supplied by the data bus to detection means simultaneously or sequentially. Passive optical sensors avoid electrical interference and incendiary risks due to electrical sparking, and color multiplexing avoids difficulties associated with other forms of multiplexing in plant environments.

20 Claims, 9 Drawing Figures

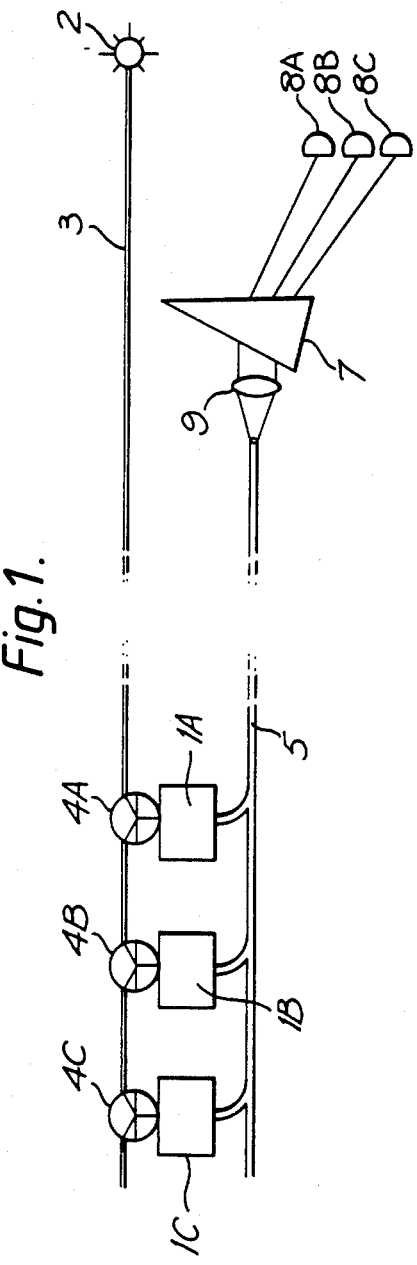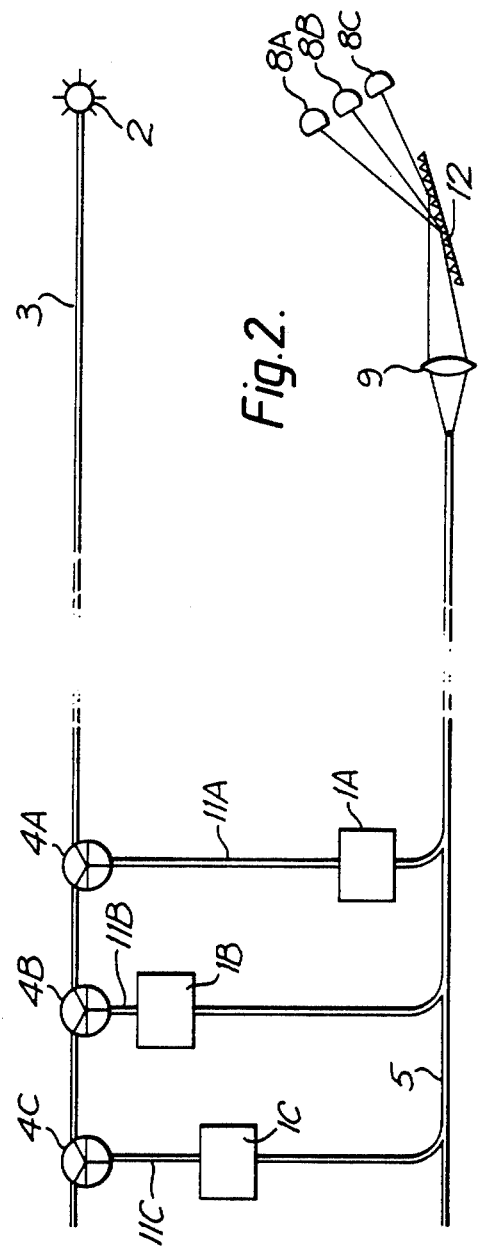

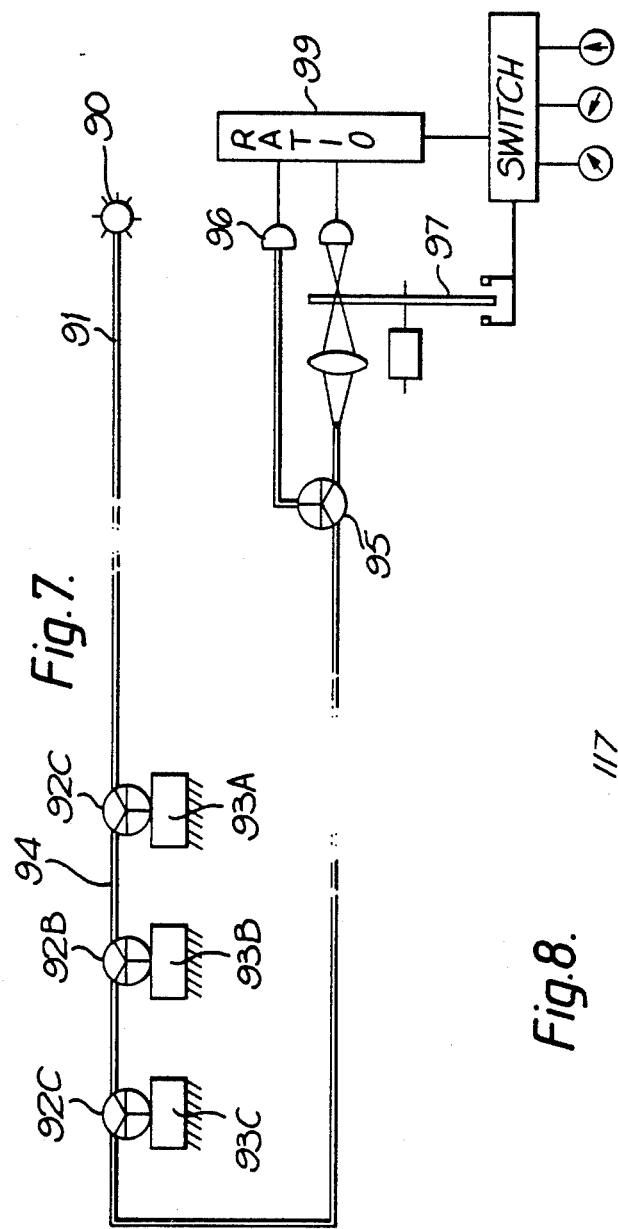
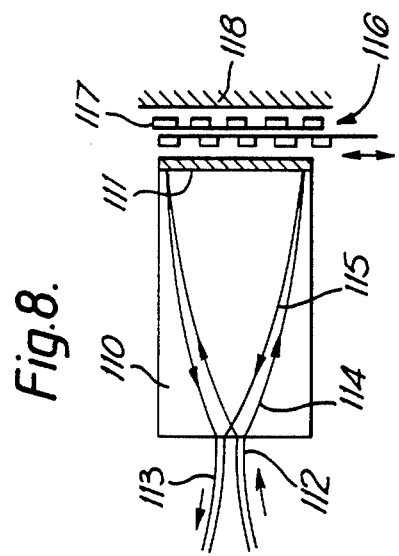
Fig.7.
Fig.8.

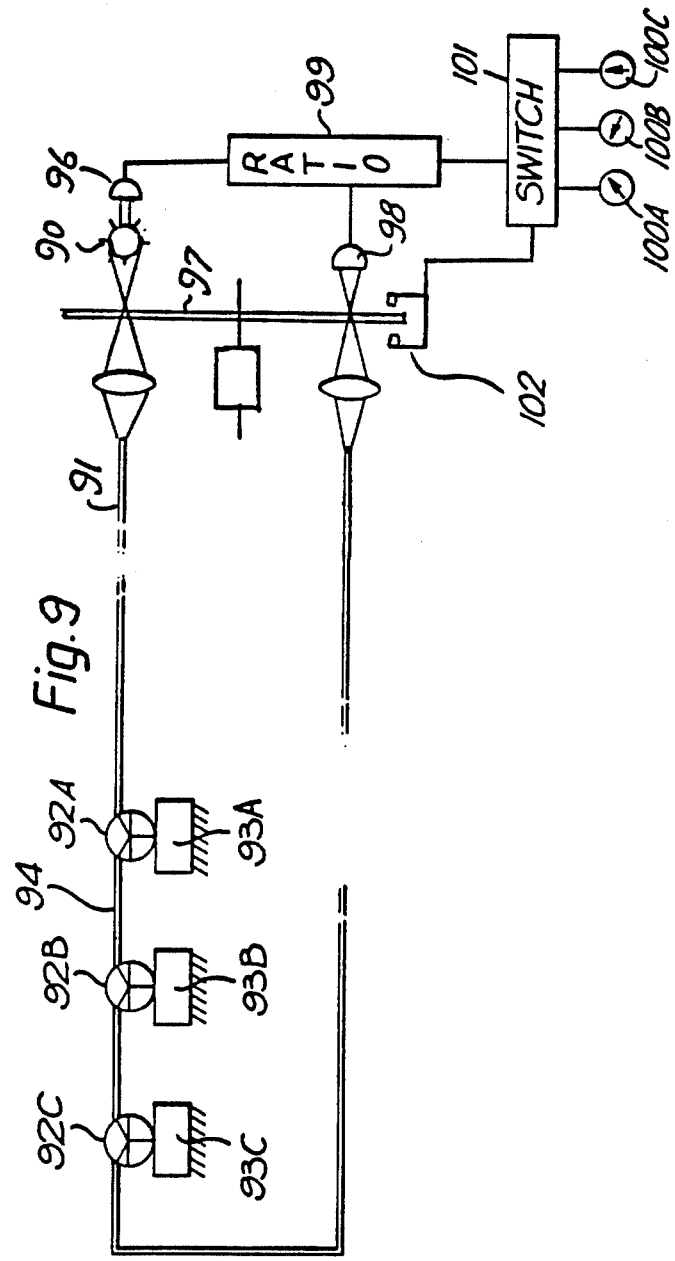

COLOR MULTIPLEXING PASSIVE SENSOR ARRAY

This invention relates to apparatus for gathering data about a plurality of chemical or physical conditions in, for example, an industrial plant environment, and communicating such data to a place remote from the conditions, using optical fibres.

In a wide range of industrial plant and similar environments, including, for example, chemical manufacture, brewing, plastics moulding, smelting and hospital boiler rooms, it is necessary to measure or monitor changes in physical or chemical conditions such as temperature, pressure and chemical composition. For reasons of safety or simply on ergonomic grounds it is usually desirable to display the values of those conditions at some common point remote from where the conditions are actually sensed, e.g. on a panel adjacent the machinery involved or in some distant control room. In the past, this information has usually been communicated as electrical signals or by such means as hydraulic or pneumatic systems. This resulted in complex networks of cables and piping, with associated problems including, for example, electrical interference, cross-talk between cables, ground loops, the complexities of setting up and maintaining a network of pressure piping and dangers of electrical sparking in fire hazard areas.

According to the present invention, an apparatus for gathering data about a plurality of chemical or physical conditions comprises:

(a) a plurality of passive optical sensors to modify light supplied to them as a function of changes in physical or chemical conditions applied to them;

(b) means for providing light for the sensors, comprising a broadband or multiband light source remote from the sensors and an optical fibre to distribute light from the source for access on behalf of each sensor;

(c) a plurality of dichroic beam splitters accessing the light distributing fibres to extract selected colours therefrom while allowing the remainder of the light to continue along the distribution fibre or continuation thereof for access by subsequent beam splitters, the colour extracted by each beam splitter being supplied to a single sensor and being different from that supplied to the other sensors, the breadth of the light source waveband or a number of wavebands being at least sufficient to include all the colours selected for supply to the sensors;

(d) an optical fibre data bus connected to receive light from each of the sensors and to convey it to a place remote from the sensors;

(e) means for separating each of the selected colours from other light conveyed by the data bus; and (f) detection means connected to receive light conveyed by the data bus and measure or detect modifications made to each colour by the sensors.

The optical sensors are passive in that they do not require a source of electrical power to activate them, being devices capable of interrogation by the light supplied to them, in respect of specific conditions applied to them. Since no electrical power is required to operate such devices, they can be used to sense chemical or physical conditions in fire hazard areas. The use of different colours for different sensors enables information derived from all the sensors to be carried along a single fibre. Moreover, by conveying the light from a remote common light source to each sensor, we have avoided any need to provide each sensor with its own light source (which would normally require electrical energy and/or heat), thereby enabling the light source to be located where most safe, most convenient for all seasons maintenance and in most cases avoiding the cost of providing individual light sources. Moreover we have now realised that the above combination of features (a-f) provides us with a characteristic which is of particular benefit when interrogating large numbers of sensors simultaneously. By splitting out each colour in turn as required, the full intensity of all the other colours remains available for subsequent sensors (except for such minor losses as may occur due to inefficiencies within the beam splitters). This would not be the case where full waveband portions of a common source were supplied to each sensor, for example; additional sources then being required with additional sensors if intensities of each colour are to be maintained.

For some chemical or physical conditions, sensors can be used which operate by sensing those conditions directly. These can include, for example, absorption of the light by a chemical compound as it passes through a light-transmitting cell or passage. However, most sensors operate indirectly using intervening devices. For example, temperature may be measured by altering the length of a solid or liquid column so as to occlude or partially occlude a light beam. Pressure and volume may similarly be measured using mechanical movement. Vibrations and rates of repetitive movement are measurable as intensity modulations, and similarly electrical frequency can be converted to an intensity modulation via an electromechanical intermediate. The sensors need not all be the same, and combinations of different parameters can be measured simultaneously by using appropriate sensors.

Our preferred sensors are devices for modifying the intensity of the light supplied to them by the beam splitters, e.g. as described above, as a function of the parameter to which they are adapted to respond. However, other modifiable properties of the light may be used provided the modification can be accomplished within the bandwidth of the colour selected. An example of such devices which is very suitable where high sensitivity is required, is an interferometer having variable interference means positioned to receive light from the beam splitter and to transmit a wavelength within the bandwidth of the selected colour supplied to it by the beam splitter, the transmitted wavelength varying as a function of the chemical or physical condition to which the device is adapted to respond. Although the bandwidth of the selected colour must be sufficient to cover the required spectrum of transmitted wavelengths, this does not create problems in practice as it is preferably equal to or less than the optical bandwidth of the interferometer, in order that only a single wavelength peak shall be transmitted. A preferred interferometer is one in which the transmitted wavelength is caused to beat with a coherent reference wavelength, e.g. as described in copending British patent application No. 8040393. Other properties which may be varied include the state of polarisation of the light.

The apparatus can be arranged with its light distributing optical fibres running parallel to a separate data bus optical fibre, the beam splitters and their associated sensors bridging the two fibres in parallel. The light can then travel in the same directions along the two fibres, e.g. where the source and detector means are spaced apart at opposite ends of the fibres, or in opposite directions to provide a more convenient configuration when the detection means is located adjacent the light source. Other configurations which we find particularly advantageous include one wherein the data bus optical fibre and the optical fibre for distributing light from the source are common over at least part of their lengths. In such a configuration the beam splitter/sensor combinations are arranged in series along the common fibre, so in order more readily to distinguish such configurations from the parallel configuration referred to above, we may refer to it herein as a "series configuration", although as will be realised each sensor will still only receive its single selected colour.

In a series configuration apparatus, each colour which is extracted by a beam splitter, after passing through its relevant sensor and possibly being modified therein, is returned to the common fibre, along which it proceeds together with colours which may not at that stage have been selected. We prefer to construct series configuration apparatus with the source optically connected to one end of the common optical fibre and the detection means to the other, the connections comprising lengths of the light distribution fibre and data bus respectively extending beyond the ends of the length of fibre used for both purposes. The source and detection means can then readily be spaced apart, or, more usually, be located adjacent each other, with the single optical fibre forming a ring main visiting each beam splitter/sensor combination in turn.

An alternative series configuration is one in which the source and detection means are located at one end of the fibre, and the other end is made reflective. However, separation of the returned signal is difficult to achieve without substantial loss of signal, and we would generally prefer to use a twin (or multi-) fibre cable, with one fibre for the outward journey and the other for the return (either or both having beam splitter/sensor combinations spaced in series along them) with a bridge at the end remote from the source, transferring light from one fibre to the other, i.e. with source and detector at either end as before. Suitable reflective ends include reflective graded index (GRIN) rod lenses.

Optical fibres are themselves sensitive to various physical conditions, such as mechanical vibrations, which can appear at the detection means as environmentally induced errors, e.g. noise, in the light signal. The light reaching the detection means can also have been modified by changes in the source output. A preferred apparatus is one which counters such errors by using a source which provides a reference colour for transmission to the detection means in addition to the selected colours, and means to compensate the selected colours for errors corresponding to changes in the reference colour intensity as received by the detection means. The compensation can sometimes be carried out at the source; for example a steady drift in wavelength or intensity with time might conveniently be compensated for by adjustment of the source. However, of more general application where the optical signals are transduced by the detection means into electrical signals, compensation for the errors can be effected by electrically comparing the signals corresponding to each of the selected colours in turn, with the signals corresponding to the reference colour. Should the environmentally induced errors be spectrally discriminating, provision of a plurality of reference colours with selected colours each having an adjacent reference colour, is preferred.

Errors induced in isolated positions can be compensated for by using a shorter reference fibre located alongside the other fibres just through these isolated positions, and bypassing the rest of the installation. However, for more complete compensation, we prefer an apparatus wherein the light from the source follows a route to the detection means which is substantially the same for all selected colours and reference colours except for such differences as may occur for each selected colour in turn while travelling from the distribution fibre to the data bus via a sensor. This is already optimised in a series configuration in which the reference colour is also passed along the single fibre which provides the common distribution fibre and data bus, and indeed this can be an important advantage for the series configuration over a corresponding parallel configuration. Nevertheless, by using adjacent fibres in the same cable, and even when using a third fibre of the same cable for the reference colour, a good approximation to the ideal series compensation can be achieved in most cases.

A beam splitter/sensor combination which is preferred for use in a series configuration is a reflective combination in that the selected colour which is extracted from the light distribution fibre is supplied to the sensor and is thereafter returned to the light distribution fibre through the same beam splitter. For parallel configurations, transmissive combinations are required in which the selected colour is passed through the sensor to enter the data bus by means (e.g. a Y junction) other than the beam splitter by which it was extracted. Transmissive combinations can also be used in a series configuration apparatus, returning the modified colour to the common fibre by means other than the beam splitter by which it was extracted.

The selectivity of the beam splitter is preferably derived from an interference filter as these can be made to pass a high proportion of the selected colour, e.g. about 80%, but more important, may reflect the other colours of the incident light almost totally. The remainder of the beam splitter provides means for directing the light onto the filter and means for collecting the transmitted and reflected colours, and directing them to the sensor and distribution fibre respectively. Our preferred beam splitter comprises a graded index rod lens terminating in an interference filter transmissive to the selected colour and reflective to any other colours carried by the light-distribution fibre.

The light source bandwidth can extend over the whole of that portion of the electromagnetic spectrum which is readily transmitted by the optical fibres. At present optical fibres can be obtained which can transmit all the visible light, the near ultra-violet, and extend well into the infra-red, the latter being particularly suitable for measuring or detecting many specific gases in gaseous mixtures, by absorption. The minimum breadth of the source waveband is that which just includes all the colours selected for the sensors, and the reference colour (if any).

While it is generally preferred to use a simple light source having only one light emitter, for some particular applications it can be helpful to use a more complex source combining several light emitters, all injecting light into the same distribution fibre. Where the several light emitters are lasers, their typically narrow bandwidths need not overlap, but can provide a multiband source having a discontinuous spectrum.

All of these sources can be used so as to give a constant output, and produce all the selected colours continuously. In such cases it is convenient to access the data bus for the modified light by using a demultiplexer for separating the colours in space, e.g. a prism or grating, and a plurality of detectors each positioned to receive a separated colour for analysis, although such spacial separation can require critical alignment of the detectors. An alternative method is to access the data bus by a series of dichroic beam splitters, and remove the colours singly for feeding to their individual detectors as before.

A preferred apparatus is one wherein the means for separating the selected colours is one which effects the separation in time (rather than in space, as above) and the selected colours comprises a detector positioned to receive all the selected colours from the data bus, singly and in a sequence dictated by the separating means. Simple but effective means for separating the colours in time, include rotatable filter discs having a plurality of filters which when positioned in the path of the light and the disc rotated, transmit each selected colour in turn, preferably with an opaque area between the filters so as to prevent overlap in the transmission of adjacent colours.

The temporal separating means is preferably positioned to separate the selected colours after they have all travelled at least part of the way along the data bus, most suitably immediately before they are fed to the detector. This enables a reference colour also to be transmitted along the same optical fibres as the selected colours and to be monitored continuously while the selected colours are temporally separated, in order that each selected colour may be corrected according to any fluctuating errors which occur while that particular colour is travelling along the fibre. Were the reference colour to be also temporally separated, it would only register errors occurring while it was being detected and not while the selected colours were being detected, but the correction can be a real time correction if the reference colour is monitored continuously.

Continuous monitoring of the reference colour can be achieved in an apparatus having means for removing at least a portion of the reference colour from the data bus before the selected colours are separated in time, and feeding that reference colour to a different detector from that to which the selected colours are fed in sequence. Any environmentally induced errors can then be compensated for as described hereinabove.

A preferred means for removing at least a portion of the reference colour from the data bus, is a dichroic beam splitter, e.g. as described hereinabove for extracting selected colours from the light distributing fibre. By using our preferred interference filter beam splitters, a high proportion of the reference colour can be extracted from the data bus without substantially reducing the intensity of the other colours before feeding them in sequence to their detector. An alternative is to split out a portion of the beam and then to filter out the selected colours from that portion to provide a reference colour; but the intensity of the remaining light is reduced by its loss of that reference portion.

The rotatable filter disc (or other temporal separator) can alternatively be located at the source so as to separate the colours in time before being distributed to the beam splitters, but any reference colour would then have to be carried by a different fibre to bypass the temporal separator, if real time corrections are to be effected through continuous monitoring. However where very narrow bandwidth colours are desired, the selectivity can be enhanced by using a rotatable filter disc having filters positioned to intercept simultaneously both the light from the source before it reaches the beam splitters accessing the light distributing fibre, and the light from the data bus before it reaches the detection means, the intercepting filters transmitting the same selected colour in each case.

Where the light source comprises a plurality of light emitters each emitting a selected colour, temporal separation can be effected at the source by masking the sources and revealing each in turn, or by switching each on in turn, as appropriate.

Temporal spacing of the colours can offer several advantages over spacial separation. In particular only a single detector is required for all the colours, thereby avoiding problems of non-uniformity, alignment or additional costs associated with the use of separate detectors for each colour. A clearer signal can be obtained as a potential source of cross-talk is avoided. The rate of temporal spacing can be relatively slow so that the different times taken for the light to travel around the different sensors can be ignored, and in this it should not be confused with basic time division multiplexing in which a single pulse of light is sent out and the light from the sensors is detected at different times, being the difference in time taken to travel the different distances between sensors. The time taken for light to travel along a short length of optical fibre is extremely small (e.g. about 50 ns for 10 m length) and requires sophisticated switching equipment to distinguish between the return pulses and to measure them. By comparison, in the present apparatus it is the colour selection which distinguishes between the various sensors, so the time interval of the temporal spacing can be as long as is needed to make each measurement e.g. using simple robust switching means more suitable for use on industrial plants. Similarly, the present invention does not require such fast reaction times in the other parts of the apparatus, e.g. in the detectors, and hence better signal to noise ratios can be obtained with less sensitive apparatus; again of considerable advantage in industrial environments. Because the present temporal separation may be so much longer than the differences in time taken for the light to travel the different distances between sensors, they can be located around the plant as and where required, using only such fibre length as may be required to make the connections.

Figure 4:
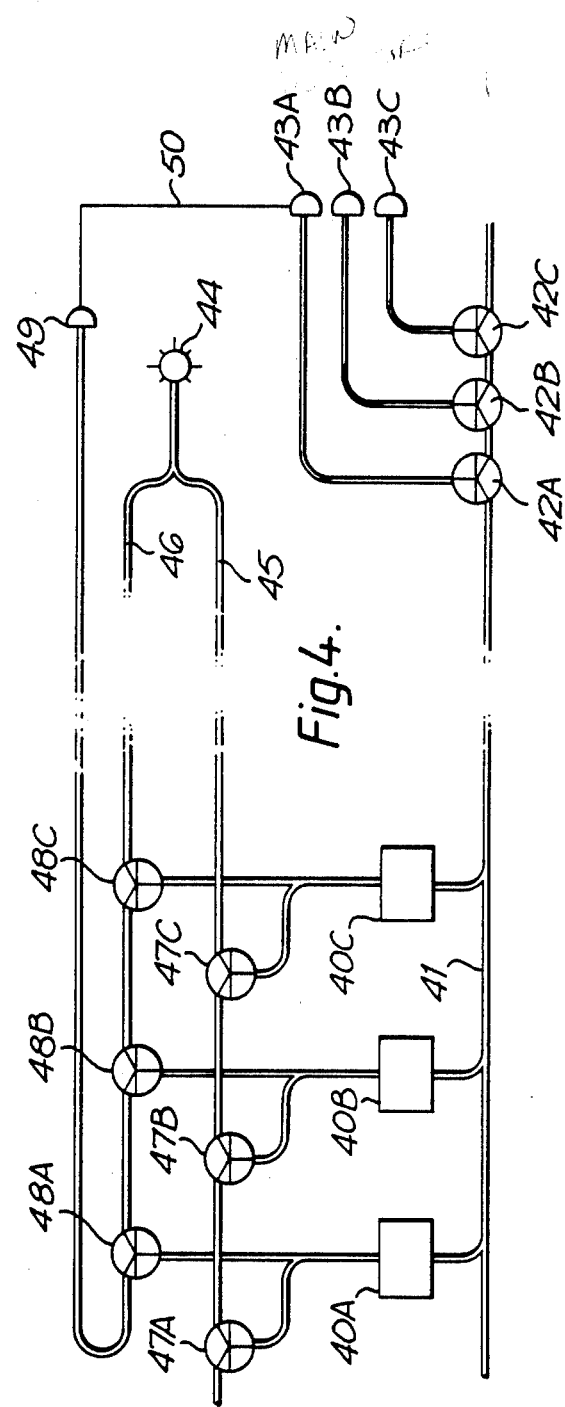
Figure 5:
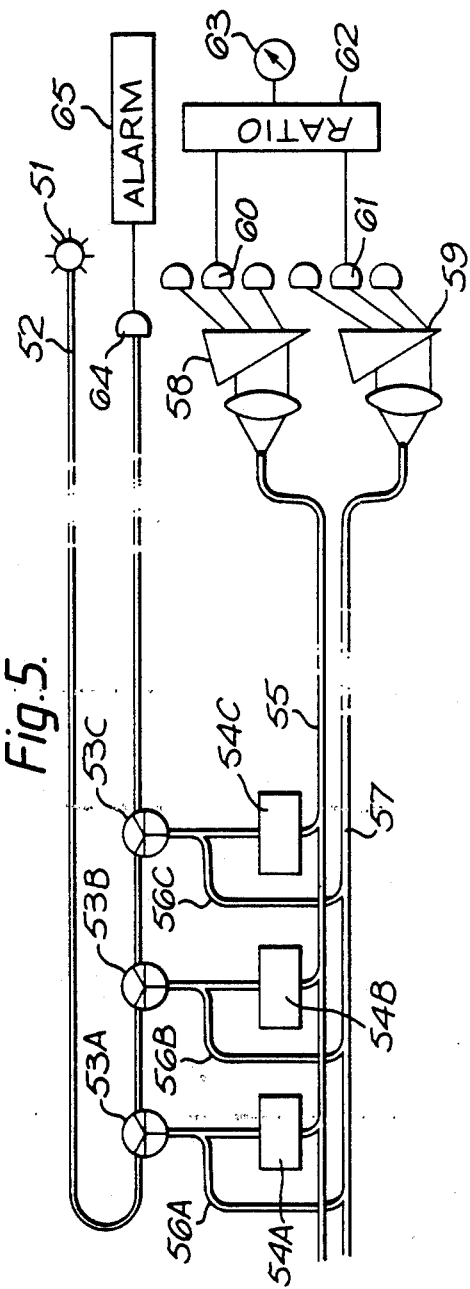
Figure 6:
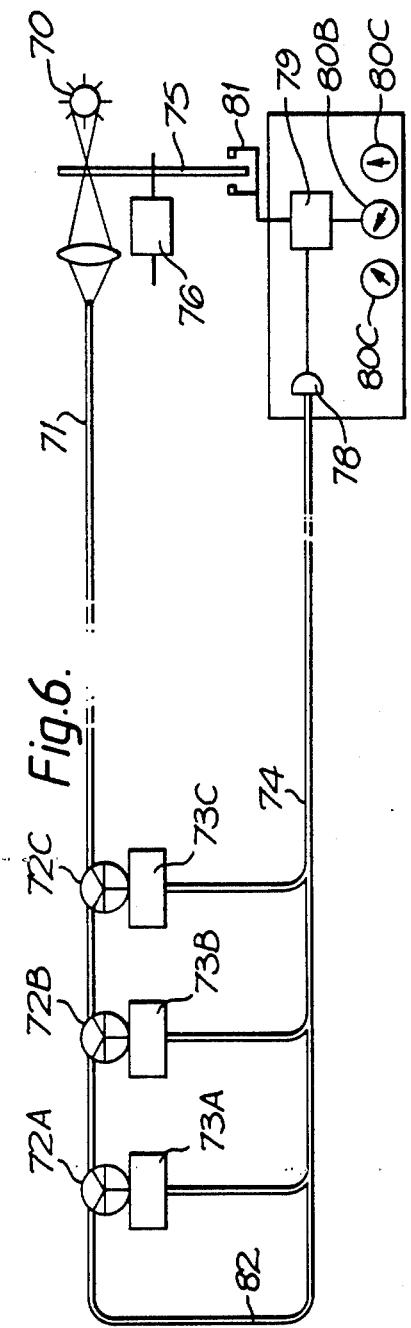

The invention will now be illustrated by reference to several specific embodiments thereof shown diagrammatically in the accompanying drawings, in which FIG. 1 shows an apparatus employing three sensors with integral beam splitters, FIG. 2 shows a similar apparatus in which the beam splitters are separate from their sensors, FIG. 3 shows a simple apparatus in which the light distributing fibre is also used as the data bus, FIG. 4 shows an apparatus employing additional fibres for greater security and easier diagnosis of fibre failure, FIG. 5 shows an apparatus having additional fibres to counter vibration and temperature variation within the plants, FIG. 6 shows an apparatus of parallel configuration employing temporal separation of the colours, FIG. 7 shows an apparatus of series configuration using reflective beam splitter/sensor combinations, FIG. 8 shows an example of a reflective beam splitting/sensor combination in more detail, and FIG. 9 shows an apparatus which is a modified form of the apparatus of FIG. 7.

The apparatus of FIG. 1 has (for exemplification purposes) three passive optical sensors 1 which modify light supplied to them as a function of changes in physical or chemical conditions applied to them. The light is supplied by a white light source 2 and distributed along an optical fibre 3. Each sensor has a built in dichroic splitter 4 which accesses the optical fibre 3 to extract only the light of a single colour, which it then supplied to its sensor 1. The remainder of the light from the first beam splitter 4A passes along the optical fibre to the next 4B where the light of a different colour is removed and supplied to the corresponding sensor 1B. This is repeated at the third beam splitter 4C. The three sensors all feed the light they have modified, into a common optical fibre data bus 5. Remote from the sensors is a demultiplexer, shown simply as a prism 7 in the diagram, for spacially splitting up the three colours travelling along the data bus, and directing them to three separate detectors 8. The demultiplexer also has an optical system 9 for collimating the light diverging from the end of the fibre.

The same symbols have been used in the diagram for each of the three beam splitters, for each of the three sensors and for each of the three detectors. Indeed they may all be the same in each case except insofar as the beam splitters need to select different colours. For example the sensors may be designed to measure the temperature at different parts of a blast furnace, or the viscosity of a fluid reactant mixture at different stages of a cascade process. However the same configuration may also be used with different sensors, designed, for example, to sense the temperature, the pressure and a light-absorbing impurity in a gas stream respectively.

At each junction within the optical system, some of the light tends to be lost, and it is generally preferred to use beam splitters which are integral with the corresponding sensor so that the light may be supplied directly thereto. However, this is not essential, and in FIG. 2 we show an apparatus in which the light is conveyed from the beam splitters to their respective sensors by additional lengths of optical fibre 11. Most of the other features of FIG. 2 are the same as those of FIG. 1, so like numerals have been used for like parts. Separation of the beam splitters from their sensors in this way can be particularly useful in some industrial plants where sensors have to be irregularly spaced. In these, it is often more convenient to separate the beam splitters from the sensors so as to enable the light-distributing fibre to take a less complex path, the beam splitters necessarily having to be located at that fibre in order to access it. Also where it is necessary to add further sensors and their respective beam-splitters it is often simpler to access the existing distribution fibre with a beam splitter remote from its sensor, than to reroute the light-distributing fibre.

Separation of the beam splitters from their respective sensors in this manner, also enables multiway splitters to be used. These may be essentially several splitters formed in a common block. This device thus has several outlets, each delivering a different colour extracted from the light beam passing through the device.

In FIG. 2 we also show a reflective grating type demultiplexer 12, as a possible alternative to the prism type of FIG. 1.

In FIG. 3, the light source comprises three lasers 31, feeding light of three different colours into the light-distributing fibre 32. Three sensors 33 have integral beam splitters 34 accessing the optical fibre 32 to remove each of the three colours in turn. The light is supplied to the sensors, modified, and then returned to the same fibre 32 from which it was extracted, to be conveyed to the demultiplexer 35 and detectors 36. Hence this single fibre acts as the data bus as well as the light distribution means. This can have advantages over the separate fibres of the previous figures when the demultiplexer is remote from the sensors by a substantial distance, in that only the single fibre is required to traverse that substantial distance. However, there is a greater danger of cross-talk, and any break in the fibre would cause a total failure of the system.

The spectrum of the composite light source in FIG. 3 is discontinuous, and, as will be realised, it is important that beam splitters be used which select the same colours as those emitted by the lasers. This discontinuous spectrum will then meet the criterion expressed above to the effect that the number of source wavebands is sufficient to include all the colours selected by the beam splitters. This form of composite source can be particularly useful where laser light is desirable for its narrow band coherency, e.g. for use with sensors employing interference techniques, or its high power, e.g. for measuring absorption by specific components in a gaseous mixture. For this, colours in the infra-red are particularly useful.

In FIG. 4, three sensors 40 send their outputs of modified light to an optical fibre data bus 41. This data bus is accessed by three dichroic beam splitters 42 feeding three detectors 43, the colours selected being those leaving the sensors. This is described here as being a possible alternative to the demultiplexer shown in the other drawings, and could be readily replaced by either of those shown in FIGS. 1 and 2 if desired.

A white light source 44 provides light along two distribution fibres 45, 46, each of which is accessed by three dichroic beam splitters 47, 48, where 47A and 48A select the same colour, as do the other pairs 47B and 48B, and 47C and 48C. These supply their selected colours to their respective sensors 40A, 40B, and 40C. One of the two distribution fibres also returns to a reference detector 49. While the apparatus is working normally, its manner of operation is the same as that of FIG. 2 except that light is supplied to each sensor from two beam splitters, each independently extracting the same colour from their respective distribution fibres.

However, if the shorter distribution fibre 45 should suffer a break between the last two beam splitters 47A and 47B, no further light will reach the end beam splitter 47A, and its sensor 40A will therefore receive only half its normal light supply. This drop in power will be seen at the corresponding detector 43A. With some intensity modulating systems, this could be confused with a change in parameter, but this problem may be overcome by scaling the apparatus to modify the intensity by only 50% for a full range determination by the sensor. If the detected intensity then drops below 50% the scale is automatically switched to a new compensated level for continued monitoring, and an alarm sounded or shown. In this case, to determine where the break occurs, when the end detector 43A shows an alarm, the break must be either between the end beam splitters 48A, 48B of the long fibre or between the end beam splitters 47A, 47B of the short fibre. However, as output of the reference detector 49 will not change in this example, the break must be in the short fibre, and hence the specific section of fibre containing the break is identified.

This is one example of how breaks can be identified by the provision of additional fibres. Other safety measures can be added (with corresponding additional installation costs) as necessary. For example a similarly duplicated data bus may be used.

The reference detector of FIG. 4 also has a further function. It is connected electronically by a line 50 to the main detectors 43A, 43B, and 43C, these latter three detectors having integral ratiometers which adjust the measurement of the modified light from the sensor according to any variation in the intensity of the light source. Similar feedback can also be readily provided in FIGS. 1 and 2.

In FIGS. 1 to 4 the detectors have merely been shown as a simple D. This is intended to indicate not only the means for detecting the light, but also means for displaying the result. Suitable means for detecting the light include phototransistors, photodiodes and photomultipliers. In the detectors of FIGS. 1 to 3, the means for displaying the result may simply be a suitably scaled galvanometer with sensitivity-matching amplifier as required. In FIG. 4 where there is feedback, the electronic reference signal is compared with signals from the detecting means, using for example, ratiometers incorporated in the detectors. In the following diagram, however, the detector used is more complex, and so has been shown in slightly greater detail.

The apparatus of FIG. 5 also has additional fibres, but for a different reason. In many industrial plants there can be considerable vibration, and in certain areas where this is particularly intense, it may produce a periodic modulation of the light transmitted through the fibre. In FIG. 5 a light source 51 feeds a distribution fibre 52 with white light. This fibre is accessed by three beam splitters 53, each of which removes its respective colour from the fibre. These colours are then split, one portion being fed via the sensor 54 to a data bus 55 as before, while the other portion is fed directly by a link fibre 56 to a second return fibre 57. The link fibres are taken through the plant along paths which follow as closely as possible, those of the fibres taking the light to and from the sensors so that both will be subjected as closely as possible to the same vibrations. The data bus 55 and the other return fibre 57 are each demultiplexed 58, 59 and detected 60, 61, the outputs from the corresponding detectors being compared 62 electronically to remove variations due to the plant vibrations, before display 63. These comparisons have been shown for one colour only, the arrangement for all the other colours being essentially similar.

At the end of the light-distribution fibre 52 is a further detector 64 connected to an alarm 65. This is arranged to sound (or light up) in the event of breakage in the distribution fibre or other light failure, i.e. when no light reaches the further detector 64.

In FIG. 6 a source of white light 70 is focussed onto the end of an optical fibre 71, which is accessed by three colour-selective beam splitters 72. The light is supplied to their associated sensors 73, modified and returned along a common data bus 74 in much the same way as in FIGS. 1 and 2. However, in this embodiment there is inserted between the source and the optical fibre, a rotatable multi-filter disc 75 having a drive motor 76; and at the other end of the apparatus, the detection means 77 comprises a detector 78 positioned to receive all the selected colours from the data bus singly and in a sequence dictated by the filter disc 75. Also within the detection means is a switching circuit 79 connected to three individual display or recording means 80 having integral hold or integrating circuits. The switching circuit is synchronised with the rotation of the disc, a reference signal being provided by an emitter-detector pair 81.

During operation the filter disc spins so as to change the colour of the light passing along the distribution fibre 71. In the period of one revolution of the disc, each of the colours selected by the three beam splitters appears along the fibre, spaced in time from the other colours. It is modified by the appropriate sensor and returns along the data bus still separate from the other colours. A signal from the detecting means 78 is directed to one of the display means 80 which registers the level of signal detected. As the disc rotates to the next colour, it causes the switching circuit to direct the output from the detector to the next display means, and similarly the signal representing the intensity of the third colour is directed to the third display means, the cycle being repeated continuously during the measurement.

Unlike the other designs, that of FIG. 6 has a connecting fibre linkage 82 bridging the distribution fibre and the data bus. This is to allow one more more non-selected colours to reach the detector to provide a reference for correcting for fluctuations in source intensity. This reference will be spaced in time from the selected colours and only one detector need be used. Where only a few colours are selected from a white source, a filter or attenuator may be inserted in this linkage fibre so that the reference colour will have the same order of magnitude as the selected colours. This linkage also provides confirmation that light is reaching all the beam splitters.

Alternatives to the multifilter disc 75 include rotatable filter discs in which the transmission colour changes smoothly from one end of the filter to the other, and tunable sources.

As an alternative to the linkage fibre 82 for providing a source-monitoring reference, a reference signal analogous to that shown in FIG. 4, can be taken either before or after the filter disc. For gradually varying filters, taking the coloured signal as a reference has the advantage of compensating for variations in transmitted intensity over the colour range. However, a particularly useful method when using a segmented, i.e. abruptly changing, filter, is to provide reflective segments which reflect light to a reference detector in synchronisation with that reaching the main detector 78.

In the figures described above, all the beam splitter/sensor combinations have been transmissive in type, even for the series configuration shown in FIG. 3. To illustrate the use of reflective beam splitter/sensor combinations, a further series configuration apparatus is shown in FIG. 7. In this apparatus, a light source 90 emits light into a distribution fibre 91. This is accessed by three beam splitters 92 which each select a colour which is different from those selected by the other two. Each supplies a selected colour to its adjacent sensor 93, which modifies the light according to the prevailing conditions, then reflects it back to the distribution fibre via the beam splitter. This part 94 of the fibre between the beam splitters is thus common to both the virgin colours being distributed and the modified colours using the fibre as a data bus.

The light, including the selected colours modified as appropriate by the sensors, continues until it reaches a further dichroic beam splitter 95, which extracts a reference colour different from the three selected colours. The reference colour has therefore not been modified by any of the sensors, but it contains information about any source fluctuation or environmentally induced errors, which would also appear undesireably in the modified selected colours. The reference colour is fed to a reference detector 96.

The remainder of the colours pass through a rotatable filter disc 97 before reaching a main detector 98. The filter disc has three filters, i.e. a number equal to the number of sensors, each of which transmits a different selected colour. On rotation of the disc, each of the selected colours is transmitted onto the main detector 98 in turn, and the output from that detector is compared with the output of the reference detector in a ratiometer 99, to compensate for any environmentally induced errors or source fluctuations.

The output from the ratiometer will be pulsed, representing each selected colour in turn, and like the outputs shown in FIG. 6, is switched to individual display means 100 in turn by a switching circuit 101. This switching circuit is again synchronised with the disc rotation by a reference signal provided by an emitter-detector pair 102.

FIG. 8 shows a reflective beam splitter/sensor combination of a kind suitable for use in the apparatus of FIG. 7 as the combination 92/93. The beam splitter comprises a GRIN rod lens 110 terminating in an interference filter 111 transmissive to the selected colour and reflective to any other colours carried by the light distribution fibre 112. This fibre is displaced slightly off the axis of the lens so as to have a mirror image position, in which is located a continuation 113 of the light distribution film. The path of the light through the lens is depicted diagrammatically by ingoing rays 114 and reflected rays 115.

Immediately behind the filter is the sensor 116 comprising a light amplitude modulator 117 in the form of a variable coincidence double grating, one grating being fixed the other being moveable according to changes in the chemical or physical condition being monitored, and a reflective surface 118 located behind the modulator. The selected colour (not shown) which is transmitted through the filter 111 passes through the modulator, being attenuated according to the relative positions of the gratings as it does so, and is reflected by the surface 118 back through the modulator and filter.

The lens and reflective surface are aligned to maximise the amount of reflected selected colour reaching the continuation 113 of the distribution fibre, hence this latter also becomes the data bus for carrying the modulated colours towards the detection means. Except that one fibre 113 takes the light from the GRIN rod lens and the other 112 brings it in, there is no fundamental difference between the two, one being essentially a continuation of the other; with one part providing a data bus or common function fibre, and the other a distribution or common function fibre, depending on where it is used within the circuit, e.g. at station A, B or C in FIG. 7.

In the apparatus of FIG. 9 the filter disc has filters positioned to intercept simultaneously both the light from the source before it reaches the beam splitter accessing the light distribution fibre and the light from the data bus before it reaches the detection means, the intercepting filters transmitting the same selected colour in each case.

Each of the embodiments shown in the drawings have been described as having three sensors. This is for convenience of illustration and is not intended to imply that this is a preferred number, much larger numbers being generally more appropriate in practice. Furthermore, the various embodiments shown in the drawings have been selected to exemplify a number of alternative features, which can be combined to make up apparatus of the present invention. The features shown give advantages in appropriate situations, but other combinations could be used to advantage in other situations. For example, the individual vibration correcting links 56 of FIG. 5 could be incorporated into the temporal spacing apparatus of FIG. 6 when this is being used in a plant subjected to excessive vibrations or rapid temperature variations. Similarly, the beam splitters in the apparatus of FIG. 4 may be replaced by a single prism or grating demultiplexer, or the transmissive beam splitter/sensor combination of FIG. 3 could be replaced by the reflective devices of FIG. 8, advantageously in some circumstances.

What we claim is:

1. Apparatus for gathering data about a plurality of chemical or physical conditions comprises:
   (a) a plurality of passive optical sensors to modify light supplied to them as a function of changes in physical or chemical conditions applied to them;
   (b) means for providing light for the sensors, comprising a broadband or multiband light source remote from the sensors and an optical fibre to distribute light from the source for access on behalf of each sensor;
   (c) a plurality of dichroic beam splitters accessing the light distribution fibre to extract selected colours therefrom in turn while allowing the remainder of the light to continue along the distribution fibre for access by subsequent beam splitters, the colour extracted by each beam splitter being supplied to a single sensor and being different from that supplied to the other sensors, the breadth of the light source waveband or numbers of wavebands being at least sufficient to include all the colours selected for supply to the sensors;
   (d) an optical fibre data bus connected to receive light from each of the sensors and to convey it to a place remote from the sensors;
   (e) means for separating each of the selected colours from other light conveyed by the data bus; and
   (f) detection means connected to receive the separated colours for measuring or detecting modifications made to each colour by the sensors.

2. Apparatus as claimed in claim 1 wherein the data bus optical fibre and the optical fibre for distributing light from the source are common over at least part of their lengths.

3. Apparatus as claimed in claim 2 wherein the light source is optically connected to one end of the common optical fibre and the detection means to the other, the connections comprising lengths of light distribution fibre and data bus respectively extending beyond the ends of the length of fibre common to both purposes.

4. Apparatus as claimed in claim 3 wherein the optical fibre interconnecting the source and detection means comprises two fibres of a twin or multi-fibre cable, the source and detection means being connected to different fibres at the same end of the cable, with a bridge at the other end to transfer light from one fibre to the other, beam splitter/sensor combinations being spaced in series along at least one of the two fibres.

5. Apparatus as claimed in claim 2 wherein at least one beam splitter and sensor provide a reflective combination in that the selected colour which is extracted from the light distribution fibre is supplied to the sensor and is thereafter returned to the light distribution fibre through the same beam splitter.

6. Apparatus as claimed in claim 1 wherein the beam splitter comprises a graded index rod lens terminating in an interference filter transmissive to the selected colour and reflective to any other colours carried by the light distribution fibre.

7. Apparatus as claimed in claim 1 wherein the sensor comprises means to transmit a wavelength within the bandwidth of the selected colour supplied to it by the beam splitter, the transmitted wavelength varying as a function of the chemical or physical conditions applied to the sensor.

8. Apparatus as claimed in claim 7 wherein the sensor is an interferometer, the bandwidth of the selected colour being equal to or less than the optical bandwidth of the interferometer, and the transmitted wavelength is caused to beat with a coherent reference wavelength.

9. Apparatus as claimed in claim 1 wherein at least one of the sensors is a device for modifying the intensity of the light supplied to it by the beam splitter as a function of the chemical or physical condition.

10. Apparatus as claimed in claim 9 wherein the source provides a reference colour for transmission to the detection means in addition to the selected colours, and there is also provided means to compensate the selected colours for errors as measured by changes in the reference colour intensity received by the detection means.

11. Apparatus as claimed in claim 10 wherein the light from the source follows a route to the detection means which is substantially the same for all selected and reference colours except for such differences as may occur for each selected colour in turn while travelling from the distribution fibre to the data bus via a sensor.

12. Apparatus as claimed in claim 9 or claim 10 wherein there is provided a plurality of reference colours, and the selected colours each have an adjacent reference colour whose intensity changes are used as a measure of the errors for which it is compensated.

13. Apparatus as claimed in claim 1 having means for separating the selected colours in time, and wherein the detection means comprises a detector positioned to receive all the selected colours from the data bus singly and in a sequence dictated by the separating means.

14. Apparatus as claimed in claim 13 wherein the means for separating the selected colours in time comprises a rotatable filter disc having a plurality of filters corresponding to the selected colours, the filters being arranged in the disc so as to intercept the light in turn when the disc is rotated, thereby to transmit each of the selected colours in sequence.

15. Apparatus as claimed in claim 14 wherein the rotatable filter disc has filters positioned to intercept simultaneously both the light from the source before it reaches the beam splitter accessing the light distribution fibre, and the light from the data bus before it reaches the detection means, the intercepting filters transmitting the same selected colour in each case.

16. Apparatus as claimed in claim 13 wherein the means for separating the colours in time is positioned to separate the selected colours after they have travelled at least part of the way along the data bus.

17. Apparatus as claimed in claim 16 having means for removing at least a portion of a reference colour from the data bus before the selected colours are separated in time, and feeding that reference colour to a different detector from that to which the selected colours are fed in sequence, the reference colour being a colour emitted by the source but which is not selected for any of the sensors.

18. Apparatus as claimed in claim 17 wherein the means for removing at least a portion of the reference colour is a dichroic beam splitter.

19. Apparatus as claimed in claim 1 having a parallel configuration in which an additional light distribution fibre is provided and a predetermined portion of the total amount of each selected colour is distributed along each distribution fibre, the additional fibre being terminated by an additional detector, whereby a single break in either of the distribution fibres produces a unique change in the spectra reaching the detection means and additional detector, according to the part of the distribution fibre in which the break occurs.

20. Apparatus as claimed in claim 13 wherein the means for separating the colours in time it provided with the means for providing light for the sensors, such that the light from the source is in the form of the sequence of selected colours when it is caused to travel along the distribution fibre for access by the beam splitters.

* * * * *